US012699858B1

(12) United States Patent

Good et al.

(10) Patent No.: US 12,699,858 B1
(45) Date of Patent: Aug. 4, 2026

(54) IMAGING READER WITH DUAL IMAGER SCAN ENGINE WITH SINGLE ILLUMINATION SYSTEM

(71) Applicant: Hand Held Products, Inc., Charlotte, NC (US)

(72) Inventors: Timothy Good, Indian Land, SC (US); Gennady Germaine, Cherry Hill, NJ (US)

(73) Assignee: Hand Held Products, Inc, Charlotte, NC (US)

( * ) Notice: Subject to any disclaimer, the term of this patent is extended or adjusted under 35 U.S.C. 154(b) by 0 days.

(21) Appl. No.: 19/361,980

(22) Filed: Oct. 17, 2025

(51) Int. Cl.
 *G06K 7/10* (2006.01)
 *G06K 7/14* (2006.01)

(52) U.S. Cl.
 CPC ....... *G06K 7/10722* (2013.01); *G06K 7/1413* (2013.01); *G06K 7/1417* (2013.01)

(58) Field of Classification Search
 CPC . G06K 7/10722; G06K 7/1413; G06K 7/1417
 USPC ..................................................... 235/462.11
 See application file for complete search history.

(56) References Cited

U.S. PATENT DOCUMENTS

| | | | |
|---|---|---|---|
| 7,347,374 B2 | 3/2008 | Zhu et al. | |
| 2015/0334282 A1* | 11/2015 | Tan | G06K 7/10801 348/370 |
| 2023/0222305 A1* | 7/2023 | Gurevich | G06K 7/10881 235/462.1 |
| 2023/0419064 A1* | 12/2023 | Xian | G06K 7/10801 |
| 2025/0052904 A1* | 2/2025 | Tenhunen | G01S 17/931 |

* cited by examiner

*Primary Examiner* — Michael G Lee
*Assistant Examiner* — David Tardif
(74) *Attorney, Agent, or Firm* — Alston & Bird LLP

(57) ABSTRACT

The present disclosure provides an optical assembly comprising a first imaging sensor having a first field of view (FOV) and a first scanning range, a second imaging sensor having a second FOV greater than the first FOV and a second scanning range less than the first scanning range, and an illumination system comprising a single illumination light source and a single illumination lens. The illumination lens projects light with a first portion having a first field of illumination (FOI) and a first brightness and a second portion having a second FOI and a second brightness, where the first FOI is smaller than the second FOI, the first brightness is greater than the second brightness, the second portion surrounds the first portion, and the first portion comprises a majority of the power of the projected light. The optical assembly compensates for brightness variation when imaging an object.

20 Claims, 5 Drawing Sheets

304

302

FAR-FIELD RANGE

NEAR-FIELD RANGE

310

IMAGING READER WITH DUAL IMAGER SCAN ENGINE WITH SINGLE ILLUMINATION SYSTEM

FIELD OF INVENTION

The present disclosure relates to optical imaging systems for barcode scanning, and more particularly to a dual imager barcode scan engine with a single illumination system adapted for both near-field and far-field imaging.

BACKGROUND

Barcode scanning technology has become ubiquitous in modern commerce, logistics, and inventory management systems. A barcode reader (also referred to as a barcode scanner, an indicia data capturing device, or simply an imaging reader) is an electronic device that can capture information stored in barcodes and other indicia, such as QR codes. Such readers often have a scan engine that includes an imaging sensor to capture an image of the indicia, an illumination light to illuminate the indicia for image capture, and an aiming light (often called an aimer) to enable a user to aim the reader at the indicia. Traditional barcode readers typically employ optical imaging systems to capture and decode barcode symbols across various working distances and environmental conditions.

Modern barcode scanning applications often require the ability to read symbols across an extended range of working distances, from very close proximity to several feet away. This extended range capability presents challenges in optical system design, particularly in balancing the competing requirements of field of view, scanning range, and illumination coverage. Close-range scanning typically benefits from wide field of view imaging to capture larger symbols or multiple symbols simultaneously, while far-range scanning generally requires narrow field of view imaging with greater magnification to resolve smaller or more distant symbols.

Conventional approaches to addressing these competing requirements have involved the use of multiple imaging components with different optical characteristics, each optimized for specific distance ranges. Such dual-imager systems commonly employ separate illumination subsystems tailored to each imaging component's field of view and working distance. Near-field imaging components are typically paired with wide-angle illumination subsystems, while far-field imaging components are paired with narrow-beam, higher-intensity illumination subsystems.

The use of multiple illumination subsystems in dual-imager barcode scanning systems contributes to increased system complexity, component count, power consumption, and overall device size. These factors can limit the integration of such systems into compact mobile terminals and handheld devices where space and power constraints are particularly stringent. Additionally, the manufacturing and assembly costs associated with multiple illumination subsystems can impact the commercial viability of such scanning solutions.

Furthermore, the illumination requirements for dual-imager systems can vary significantly depending on ambient lighting conditions and the specific scanning scenario. In many practical applications, the full capability of both illumination subsystems may not be utilized simultaneously, leading to inefficient use of system resources and potentially unnecessary complexity in the overall optical design.

Applicant has identified many technical challenges and difficulties associated with illumination systems of barcode readers/scanners. Through applied effort, ingenuity, and innovation, Applicant has solved problems related to illumination systems of barcode readers/scanners by developing solutions embodied in the present disclosure, which are described in detail below.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, an optical assembly is provided. The optical assembly comprises a first imaging sensor having a first field of view (FOV) and a first scanning range. The optical assembly comprises a second imaging sensor having a second FOV greater than the first FOV and a second scanning range less than the first scanning range. The optical assembly comprises an illumination system comprising a single illumination light source and a single illumination lens to project light emitted from the illumination light source. The illumination lens is configured such that the projected light comprises a first portion having a first field of illumination (FOI) and a first brightness and a second portion having a second FOI and a second brightness. The size of the first FOI is smaller than the size of the second FOI. The first brightness is greater than the second brightness. The second portion surrounds the first portion. The first portion comprises a majority of the projected light. The optical assembly is configured to, when imaging an object, compensate for a variation of brightness of the light projected onto the object due to the different FOI and/or brightness of the first and second portions of the projected light.

According to other aspects of the present disclosure, the optical assembly may comprise one or more of the following features. The optical assembly may further comprise processing circuitry. The processing circuitry may be part of the first imaging sensor and/or the second imaging sensor. The processing circuitry may be configured to apply a relative illumination calibration function to an image captured by either the first imaging sensor or the second imaging sensor of an object to normalize the brightness across the image. The first imaging sensor and/or the second imaging sensor may be configured to capture two or more images of an object at different exposures, and the processing circuitry may be configured to stitch together one or more different portions of each of the two or more images having different brightnesses to create a combined image having a more uniform level of brightness. The one or more different portions of each of the two or more images may comprise one or more annular portions. The first imaging sensor and/or the second imaging sensor may have a non-linear exposure function such that a central portion of its FOV is exposed less than a peripheral portion of its FOV to provide a more uniform exposure effect across its FOV. The illumination system may be configured to vary an intensity of the projected light and a time of exposure to reduce brightness saturation in from the first portion of the projected light. The first scanning range of the first imaging sensor may be variable. The optical assembly may further comprise an aiming system comprising an aiming light source and an aiming lens through which aiming light from the aiming light source is transmitted.

According to another aspect of the present disclosure, an imaging reader for electro-optically reading a symbol by image capture is provided. The imaging reader comprises a housing and an optical assembly mounted in the housing. The optical assembly comprises a first imaging sensor having a first field of view (FOV) and a first scanning range. The optical assembly comprises a second imaging sensor having a second FOV greater than the first FOV and a second scanning range less than the first scanning range. The optical assembly comprises an illumination system comprising a single illumination light source and a single illumination lens to project light emitted from the illumination light source. The illumination lens is configured such that the projected light comprises a first portion having a first field of illumination (FOI) and a first brightness and a second portion having a second FOI and a second brightness. The first FOI is less than the second FOI. The first brightness is greater than the second brightness. The second portion surrounds the first portion. The first portion comprises a majority of the power of the projected light. The optical assembly is configured to, when imaging an object, compensate for a variation of brightness of the light projected onto the object due to the different FOI and/or brightness of the first and second portions of the projected light.

According to other aspects of the present disclosure, the imaging reader may comprise one or more of the following features. The optical assembly may further comprise processing circuitry. The processing circuitry may be part of the first imaging sensor and/or the second imaging sensor. The processing circuitry may be configured to apply a relative illumination calibration function to an image captured by either the first imaging sensor or the second imaging sensor of an object to normalize the brightness across the image. The first imaging sensor and/or the second imaging sensor may be configured to capture two or more images of an object at different exposures, and the processing circuitry may be configured to stitch together one or more different portions of each of the two or more images having different brightnesses to create a combined image having a more uniform level of brightness. The one or more different portions of each of the two or more images may comprise one or more annular portions. The first imaging sensor and/or the second imaging sensor may have a non-linear exposure function such that a central portion of its FOV is exposed less than a peripheral portion of its FOV to provide a more uniform exposure effect across its FOV. The illumination system may be configured to vary an intensity of the projected light and a time of exposure to reduce brightness saturation in from the first portion of the projected light. The first scanning range of the first imaging sensor may be variable. The optical assembly may further comprise an aiming system comprising an aiming light source and an aiming lens through which aiming light from the aiming light source is transmitted.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

Figure 1:
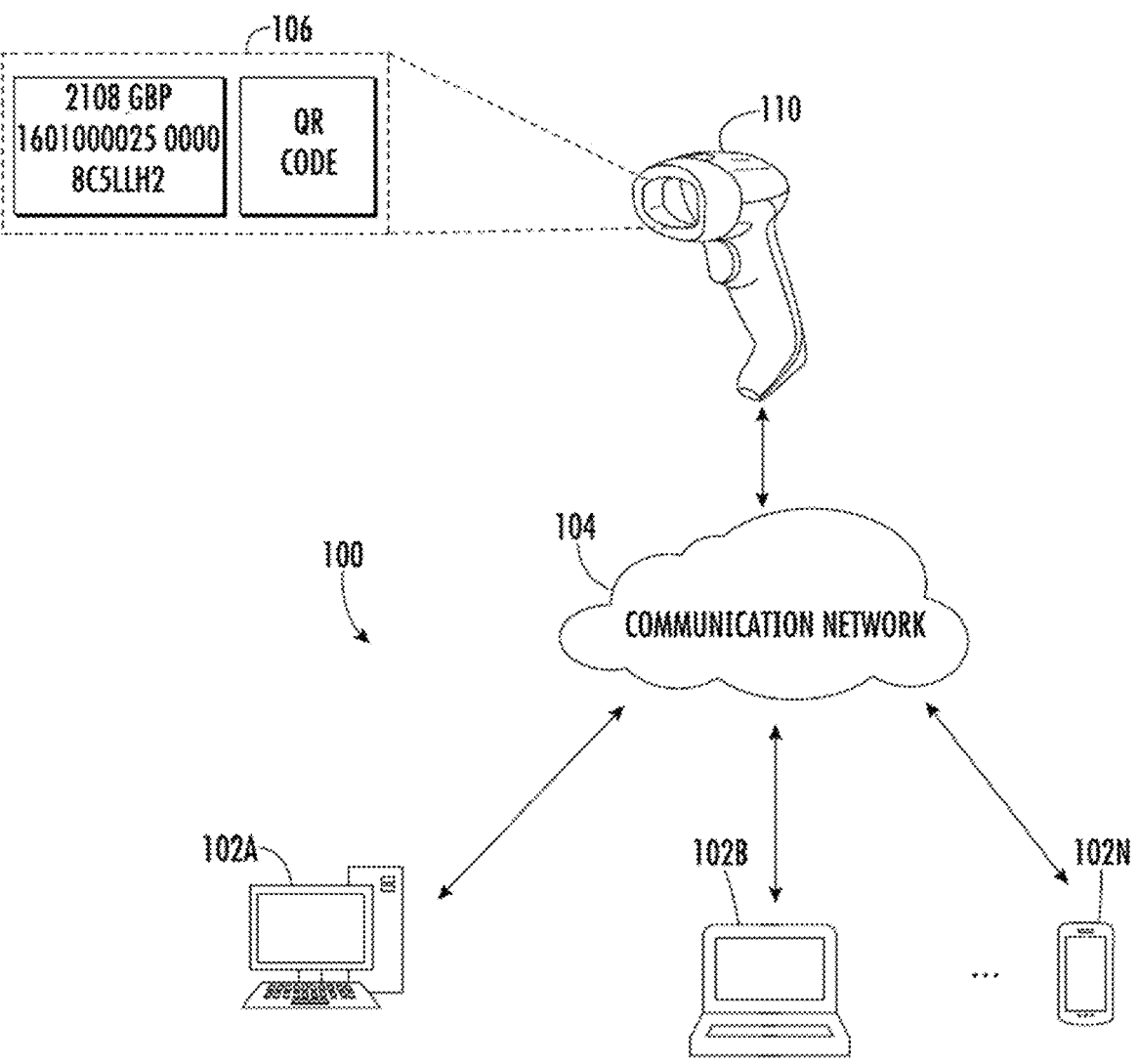
FIG. 1 illustrates an indicia data capturing and processing platform, according to aspects of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

Unless specifically set forth herein, the terms "a," "an" and "the" are not limited to one element but instead should be read as meaning "at least one." The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

In the present disclosure, the term "indicia" refers to one or more machine-readable/machine-decodable codes and/or symbols that represent data and information in a visual form that may include, but not limited to, patterns, lines, numbers, letters, and/or the like. Examples of indicia may include, but are not limited to, one-dimensional (1D) barcodes, two-dimensional (2D) barcodes, Quick Response (QR) codes, information-based indicia, Aztec codes, data matrix, texts, and/or the like. In some embodiments, indicia may be affixed, printed, or otherwise attached to items and/or objects to provide information regarding the item or the object in a machine-readable/machine-decodable format. In some embodiments, indicia may be permanently marked (such as by etching) directly onto the surface of a part or product using a technique termed Direct Part Marking (DPM).

While embodiments of the present disclosure are described herein in relation to indicia data capturing devices, such as barcode readers and the like, embodiments of the present disclosure may be used in any suitable imaging device that has autofocus capability. Such devices are referred to herein generically as imaging devices.

In some embodiments, to capture data and/or information from indicia, an indicia data capturing device may be used. In the present disclosure, the term "indicia data capturing device" refers to a device that electro-optically reads and/or scans indicia. Examples of indicia data capturing devices may include, but are not limited to, barcode scanners, QR code scanners, imaging scanners, area-image scanners, imaging readers, and/or the like. In some embodiments, an example indicia data capturing device may be hand-held (for example, a scanner that can be moved by a user's hand over the indicia being scanned). In some embodiments, an example indicia data capturing device may be fixedly mounted (for example, a scanner that is mounted on top of a counter or a table).

As an example, a user may trigger an indicia data capturing device (e.g., by pulling a trigger of an indicia data capturing device, by pointing an indicia data capturing device in streaming mode at the indicia, etc.) to capture indicia imaging data of the indicia. In some embodiments, the indicia imaging data may comprise digital images of the indicia. In some embodiments, the indicia data capturing device may illuminate its field of view with a visible light source (such as, but not limited to, white light or laser light) through its illumination component during image capture, especially in low lighting conditions, to provide light above and beyond the ambient light of the user environment. In some embodiments, illuminating the indicia during imaging helps ensure that the captured indicia imaging data is suitable for processing.

In some embodiments, after the indicia data capturing device captures the indicia imaging data, the indicia data capturing device may process the indicia imaging data through a processor that is part of an indicia data capturing device. In some embodiments, the processor recognizes the indicia from the indicia imaging data and decodes the indicia according to a type of the indicia (such as, but not limited to, 1D barcodes, 2D barcodes, QR codes and/or the like) and/or a symbology format of the indicia (such as, but not limited to, Code 11, Code 128, and/or the like).

Some indicia data capturing devices, such as barcode readers, have autofocus capabilities to automatically focus their imaging component to capture images at range of different distances. Various types of actuators are used to move the lens, such as ultrasonic motors, stepper motors, linear motors, voice coil motors (VCM), and piezoelectric motors.

Indicia data capturing devices, such as barcode readers, often have an aiming component or aimer to enable a user to ensure that the device is accurately pointed at the indicia to be scanned. Many indicia data capturing devices use a laser as an aimer, which may also be used as part of an autofocus system as described above.

Dual imager barcode scan engines may incorporate multiple imaging components to achieve extended scanning range capabilities across varying scanning distances. Traditional implementations may utilize separate illumination subsystems for each imaging component, which can increase size, complexity, and manufacturing costs. The present disclosure addresses these challenges through a unified illumination approach that serves multiple imaging components with a single illumination system comprising a single illumination light source and a single illumination lens to project light emitted from the illumination light source in a desired pattern that is capable of providing sufficient illumination for capturing images of objects in the near field or in the far field.

The illumination lens is configured to create a projected light pattern having distinct characteristics across different regions. The projected light comprises a first portion having a first field of illumination and a first brightness, and a second portion having a second field of illumination and a second brightness. The first field of illumination is narrower than the second field of illumination, while the first brightness is greater than the second brightness. The second portion may surround the first portion, creating a concentrated central region with peripheral illumination coverage that is less bright than the central region. The first portion comprises a majority of the power of the projected light, concentrating illumination energy where far field imaging sensors may benefit from higher intensity illumination to adequately illuminate objects in the far field.

Optical assemblies incorporating this illumination approach may be configured to compensate for variations in brightness that result from the different field of illumination and brightness characteristics of the first and second portions of the projected light when imaging an object. This compensation may be achieved through various techniques that address the inherent brightness differences across the illumination pattern. Processing circuitry may apply a relative illumination calibration function to an image captured by either imaging component to normalize the brightness across the image. Such calibration functions may mathematically adjust pixel values to account for the known illumination profile, creating more uniform brightness distribution in the processed image.

Alternative compensation approaches may involve capturing two or more images of an object at different exposures, allowing the processing circuitry to stitch together different portions of each image having different brightnesses to create a combined image having a more uniform level of brightness. These different portions may comprise annular portions that correspond to the concentric illumination regions created by the dual-field illumination pattern. The illumination system is configured to vary an intensity of the projected light and a time of exposure to reduce brightness saturation from the first portion of the projected light, providing additional control over the illumination characteristics during image capture.

Some imaging components may incorporate non-linear exposure functions that provide inherent compensation for brightness variations. Such imaging components may expose a central portion of the field of view less than a peripheral portion of the field of view to provide a more uniform exposure effect across the field of view. This approach may complement the illumination pattern by naturally balancing the higher central illumination intensity with reduced exposure sensitivity in that region. The combination of tailored illumination patterns and adaptive exposure techniques may enable effective dual-field imaging with a single illumination subsystem while maintaining image quality across both near field and far field applications.

FIG. 1 illustrates an example indicia data capturing and processing platform 100 within which embodiments of the present disclosure may operate. In the example shown in FIG. 1, the indicia data capturing and processing platform 100 may comprise an indicia data capturing device 110 in electronic communication with one or more indicia data processing devices 102A, 102B, . . . 102N via a communication network 104. In some embodiments, for example, the indicia data processing devices 102A, 102B, . . . 102N may perform inventory tracking, order processing, etc.

For example, the indicia data capturing and processing platform 100 may capture and process indicia data associated with the indicia 106. While the indicia 106 in the example shown in FIG. 1 comprises texts, numbers, and a QR code, it is noted that the scope of the present discourse is not limited to the example shown in FIG. 1. As described above, an example indicia in accordance with embodiments of the present disclosure may include, but are not limited to, 1D barcodes, 2D barcodes, information-based indicia, Aztec codes, data matrix, and/or the like.

In some embodiments, a user may utilize the indicia data capturing device 110 of the indicia data capturing and processing platform 100 to capture indicia imaging data associated with the indicia 106. For example, a user may trigger the indicia data capturing device 110 by pointing the indicia data capturing device 110 at the indicia 106 and pulling the trigger of the indicia data capturing device 110. In some embodiments, the indicia data capturing device 110 may comprise an imaging component that comprises an imaging sensor. The imaging sensor may capture an image of the indicia 106 and may generate indicia imaging data corresponding to the indicia 106. In some embodiments, the indicia data capturing device 110 may comprise an illumination component that may illuminate the field of view of the imaging sensor so as to improve the imaging quality of the indicia imaging data.

In some embodiments, the indicia data capturing device 110 may communicate data and/or information (such as, but not limited to, indicia imaging data) to the one or more indicia data processing devices 102A, 102B, . . . , 102N. In some embodiments, the communication network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network 104 may include an 802.11, 802.16, 802.20, and/or WiMax network. Further, the communication network 104 may include a public network (such as the Internet), a private network (such as an intranet), or combinations thereof, and may utilize a variety of networking protocols including, but not limited to, TCP/IP based networking protocols. For instance, the networking protocol may be customized to suit the needs of the indicia data capturing device 110. In some embodiments, the protocol is a custom protocol of JSON objects sent via a WebSocket channel. In some embodiments, the protocol is JSON over RPC, JSON over REST/HTTP, and the like.

While the description above provides some examples of the communication network that can facilitate data communications between the indicia data capturing device 110 and the indicia data processing devices 102A, 102B, . . . , 102N, it is noted that the scope of the present disclosure is not limited to the description above. In some embodiments, the indicia data capturing device 110 may communicate with the indicia data processing devices 102A, 102B, . . . , 102N through other means. For example, the indicia data capturing device 110 may communicate with the indicia data processing devices 102A, 102B, . . . , 102N through communication protocols such as, but not limited to, general packet radio service (GPRS), Universal Mobile Telecommunications System (UMTS), Code Division Multiple Access 1900 (CDMA1900), CDMA1900 1X (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The indicia data capturing device 110 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), serial communication (TIA-232/RS-232) and/or the like.

In some embodiments, the one or more indicia data processing devices 102A, 102B, . . . , 102N may receive indicia imaging data from the indicia data capturing device 110 and may process the indicia imaging data to generate one or more decoded data strings that correspond to the indicia 106. Additionally, or alternatively, the indicia data capturing device 110 may generate one or more decoded data strings based on the indicia imaging data and may transmit the one or more decoded data strings to the one or more indicia data processing devices 102A, 102B, . . . , 102N.

Figure 2:
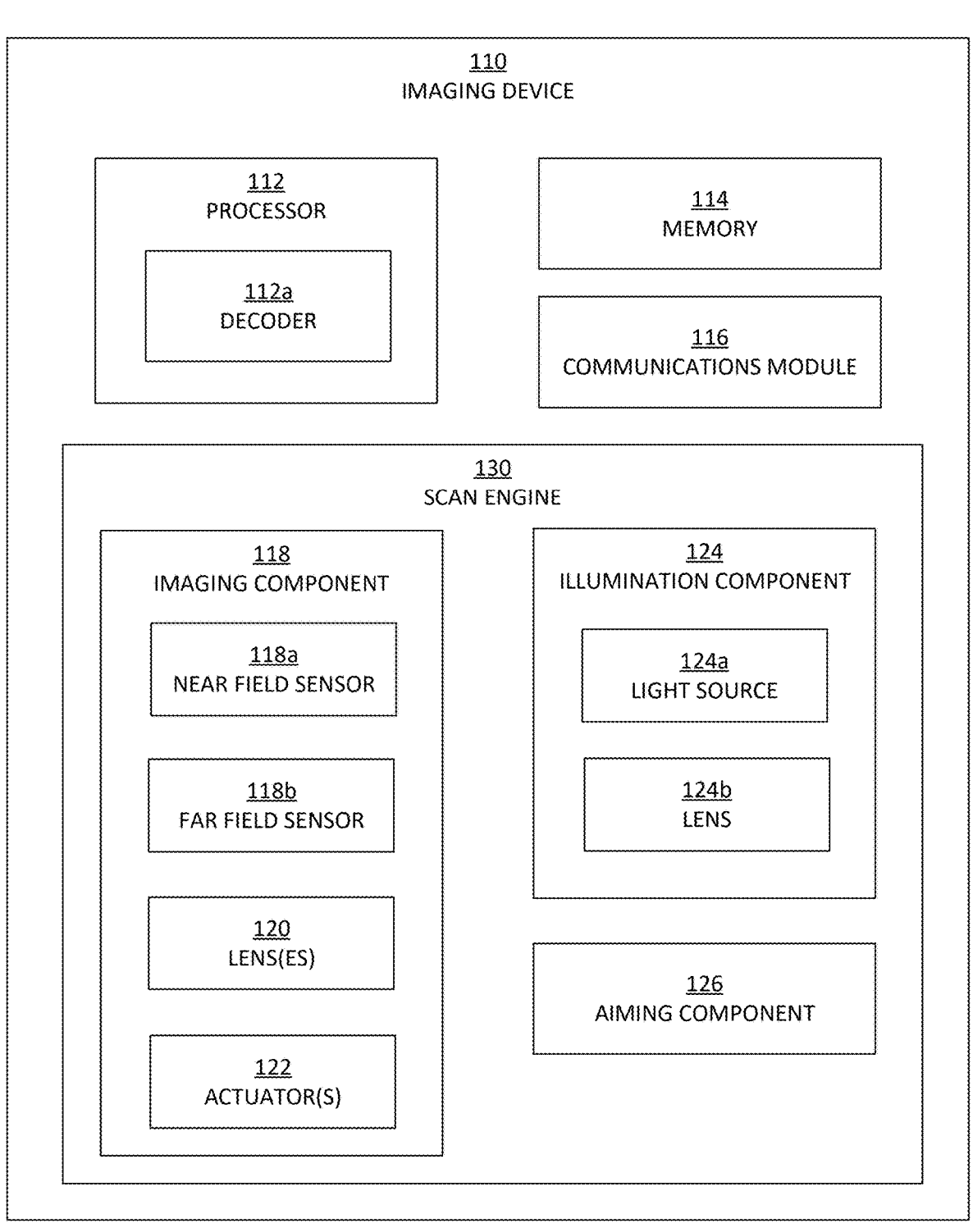
FIG. 2 illustrates a block diagram of an indicia data capturing device, according to aspects of the present disclosure.

The indicia data capturing device 110 of FIG. 1 may include a plurality of components, as shown in FIG. 2. As illustrated in FIG. 2, the indicia data capturing device 110 includes a processor 112, a memory 114, a communications module 116, and a scan engine 130. The scan engine 130 comprises an imaging component 118, an illumination component 124, and an aiming component 126 (e.g., laser). The imaging component 118 comprises a near field imaging sensor 118a, a far field imaging sensor 118b, one or more lenses 120 (e.g., one lens to focus the near field imaging sensor 118*a* and one lens to focus the far field imaging sensor 118*b*), and one or more actuators 122 (e.g., VCM) to move the one or more lenses 120 to focus the near field imaging sensor 118*a* and/or the far field imaging sensor 118*b*.

As illustrated, the processor 112 includes a decoder 112*a* for decoding the images captured by the near field imaging sensor 118*a* and/or the far field imaging sensor 118*b*, although in some alternative embodiments, the decoder may comprise a separate component from the processor. As illustrated, the illumination component 124 includes a single light source 124*a* and a single lens 124*b* to project light from the light source 124*a* in a desired pattern as described herein. Some of these components are in electronic communication with one another via a system bus. In some embodiments, a system bus refers to a computer bus that connects these components to enable data transfer and communications between these components. An indicia capturing device typically includes additional components other than those shown in FIG. 2.

In some embodiments, the near field imaging sensor 118*a* and/or the far field imaging sensor 118*b* may comprise one or more imaging sensors including, but are not limited to, a color or monochrome 1D or 2D Charge Coupled Device (CCD), Complementary Metal-Oxide-Semiconductor (CMOS), N-channel Metal-Oxide-Semiconductor (NMOS), P-channel Metal-Oxide-Semiconductor (PMOS), Charge Injection Device (CID) or Charge Modulation Device (CMD) solid state image sensor, and/or the like.

The near field imaging sensor 118*a* has a field of view that is wider than the field of view of the far field imaging sensor 118*b*, enabling the near field imaging sensor 118*a* to capture images of objects positioned close to the indicia data capturing device 110. The near field imaging sensor 118*a* has a scanning range that is less than the scanning range of the far field imaging sensor 118*b*, providing focused imaging for objects within a limited distance range.

The far field imaging sensor 118*b* is configured to capture images of objects positioned at greater distances from the indicia data capturing device 110. The scanning range of the far field imaging sensor 118*b* may be variable, allowing the far field imaging sensor 118*b* to adjust focus across a range of distances. The far field imaging sensor 118*b* may include a variable focus camera with focus ranging from near-infinity to close focus that overlaps with the near field imaging sensor 118*a*, creating a continuous scanning range coverage from very near to very far distances. This overlapping capability may enable seamless transition between near field and far field imaging operations without gaps in the operational range. In a specific example embodiment, the near field imaging sensor 118*a* is a fixed focus imaging component with a fixed focus of between about 10 centimeters (cm) and a 40 cm and the far field imaging sensor 118*b* is a variable focus imaging component able to focus between about 40 cm and about 20 meters (m).

In some embodiments, the indicia data capturing device 110 comprises an illumination component 124 that is configured to illuminate the field of view of the imaging component 118, so as to improve the quality of the captured indicia imaging data. In some embodiments, the illumination component 124 may include an illumination source 124*a* and an illuminating optics assembly (e.g., lens 124*b*). Some examples of the illumination source may include, but are not limited to, laser diodes (for example, visible laser diodes, edge-emitting laser diodes, surface-emitting laser diodes, and/or the like) or light-emitting diodes (LEDs). The single illumination lens 124*b* is configured to shape and direct the emitted light to create a projected light pattern that serves both the near field imaging sensor 118*a* and the far field imaging sensor 118*b*.

In some embodiments, the imaging component 118, the actuator 122, the illumination component 124, and/or the decoder 112*a* may be controlled by the processor 112. For example, the processor 112 may transmit electronic instructions to the actuator 122 via the system bus to move the lens 120 to a position, may transmit electronic instructions to the illumination component 124 via the system bus to trigger the illumination component 124 to illuminate the field of view of the imaging component 118, may transmit electronic instructions to the imaging component 118 to trigger the imaging component 118 to capture indicia imaging data that include one or more images of the indicia, may receive the indicia imaging data from the imaging component 118, and may activate the decoder 112*a* to decode the indicia imaging data received from the imaging component 118.

The processor 112 may be embodied in a number of different ways and may, for example, include one or more processing devices configured to perform independently. Additionally, or alternatively, the processor 112 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

For example, the processor 112 may be embodied as one or more complex programmable logic devices (CPLDs), microprocessors, multi-core processors, co-processing entities, application-specific instruction-set processors (ASIPs), and/or controllers. Further, the processor 112 may be embodied as one or more other processing devices or circuitry. The term circuitry may refer to an entirely hardware embodiment or a combination of hardware and computer program products. Thus, the processor 112 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 112 may be configured for a particular use or configured to execute instructions stored in volatile or non-volatile media or otherwise accessible to the processor 112. As such, whether configured by hardware or computer program products, or by a combination thereof, the processor 112 may be capable of performing steps or operations according to embodiments of the present disclosure when configured accordingly.

In an example embodiment, the processor 112 may be configured to execute instructions stored in the memory 114 or otherwise accessible to the processor. Alternatively, or additionally, the processor 112 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 112 is embodied as an executor of software instructions, the instructions may specifically configure the processor to perform the algorithms and/or operations described herein when the instructions are executed.

In some embodiments, the memory 114 may be non-transitory and may include, for example, one or more volatile and/or non-volatile memories. In other words, for example, the memory 114 may be an electronic storage device (e.g., a computer readable storage medium). The memory 114 may be configured to store information, data, content, applications, instructions, or the like, for enabling the indicia data capturing device 110 to carry out various functions in accordance with example embodiments of the present disclosure. In this regard, the memory 114 may be preconfigured to include computer-coded instructions (e.g., computer program code), and/or dynamically be configured to store such computer-coded instructions for execution by the processor 112.

In an example embodiment, the indicia data capturing device 110 further includes a communications module 116 that may enable the indicia data capturing device 110 to transmit the indicia imaging data to other devices (such as, but not limited to, the indicia data processing devices 102A, 102B, . . . , 102N as shown in FIG. 1) through a communication network. The communications module 116 may be any means such as a device or circuitry embodied in either hardware or a combination of hardware and software that is configured to receive and/or transmit data from/to a network and/or any other device, circuitry, or module in communication with the indicia data capturing device 110. In this regard, the communications module 116 may include, for example, a network interface for enabling communications with a wired or wireless communication network. For example, the communications module 116 may include one or more circuitries, network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

Some examples of the indicia data capturing device 110 may include, but are not limited to, an indicia scanner, a handheld scanner, a flatbed scanner, a camera, and/or any other device that is capable of capturing a plurality of images of the indicia and/or generating indicia imaging data of the indicia. Additionally, or alternatively, the indicia data capturing device 110 may be in other form(s) and/or may comprise other component(s). For example, various embodiments of the present disclosure may be embodied as a scan engine that is integrated into another device, where the triggering and processing may be performed within this other device or on some other external device.

Figure 3:
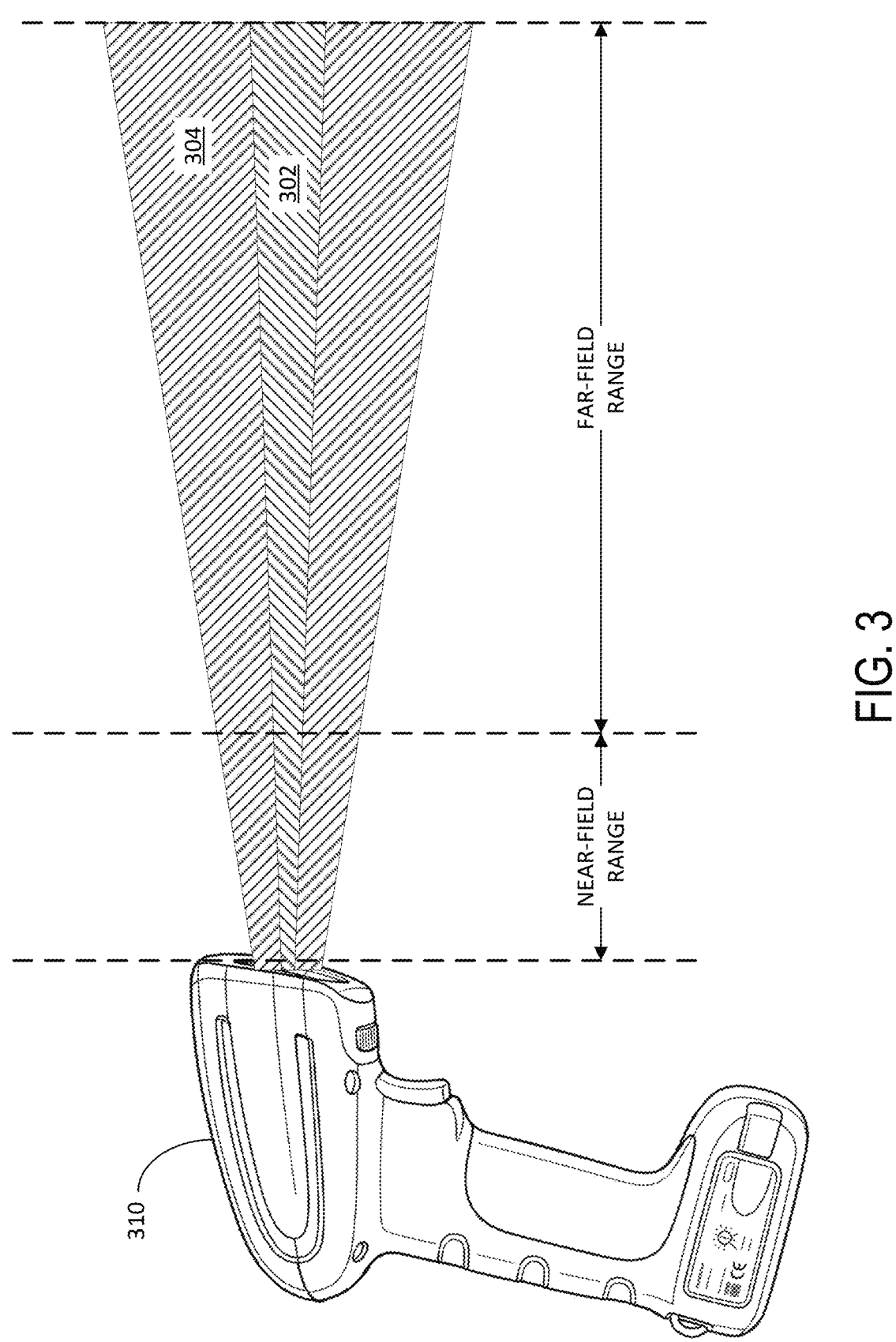
FIG. 3 illustrates a side view of an indicia data capturing device with illumination ranges, according to aspects of the present disclosure.

FIG. 3 illustrates a side view of an indicia data capturing device 310 and the spatial configuration of illumination ranges that may be generated by the illumination component 124. The indicia data capturing device 310 may be positioned to project illumination across multiple distinct ranges that correspond to the operational requirements of the near field imaging sensor 118a and the far field imaging sensor 118b. The illumination pattern is configured to provide concentrated illumination energy where far field imaging applications may benefit from higher intensity light while simultaneously providing broader, less bright coverage for near field scanning operations. The spatial relationship between these illumination ranges may enable a single illumination system to serve dual imaging components without requiring separate illumination subsystems for each imaging component.

As shown in FIG. 3, a far field range 302 extends from the indicia data capturing device 310 to provide concentrated illumination for objects positioned at greater distances from the device. The far field range 302 is characterized by a narrower angular spread that concentrates illumination energy within a focused beam pattern. This concentrated illumination pattern may correspond to a first portion of projected light having a first field of illumination and a first brightness, where the first field of illumination is narrower than other illumination regions. The first brightness is greater than brightness levels in surrounding illumination areas, enabling effective illumination of distant objects that would otherwise receive insufficient light for imaging operations. The far field range 302 comprises a majority of the power of the projected light from the illumination component 124, concentrating the available illumination energy where far field imaging sensors may derive the greatest benefit from enhanced light intensity.

With continued reference to FIG. 3, a near field range 304 extends outward from the indicia data capturing device 310 to provide illumination coverage for objects positioned in close proximity to the device. The near field range 304 is characterized by a wider angular spread that distributes illumination across a broader area as compared to the far field range 302. This broader illumination pattern may correspond to a second portion of projected light having a second field of illumination and a second brightness, where the second field of illumination is wider than the first field of illumination of the far field range 302. The second brightness is less than the first brightness of the far field range 302, reflecting the reduced illumination intensity that may be distributed across the wider coverage area. The near field range 304 may surround the far field range 302, creating a peripheral illumination zone that encompasses the concentrated central illumination region.

The illumination configuration shown in FIG. 3 may enable the indicia data capturing device 310 to provide appropriate illumination characteristics for both near field and far field imaging operations through a single illumination system. The far field range 302 may deliver concentrated illumination energy that compensates for the inverse square law effects that reduce light intensity at greater distances, while the near field range 304 provides sufficient illumination coverage for wide field of view imaging operations at closer distances. The overlapping coverage areas of the far field range 302 and the near field range 304 may create a continuous illumination field that supports seamless operation across varying scanning distances. This dual-range illumination approach may eliminate the need for separate illumination subsystems while maintaining effective illumination characteristics for both imaging components of the indicia data capturing device 310.

Figure 5:
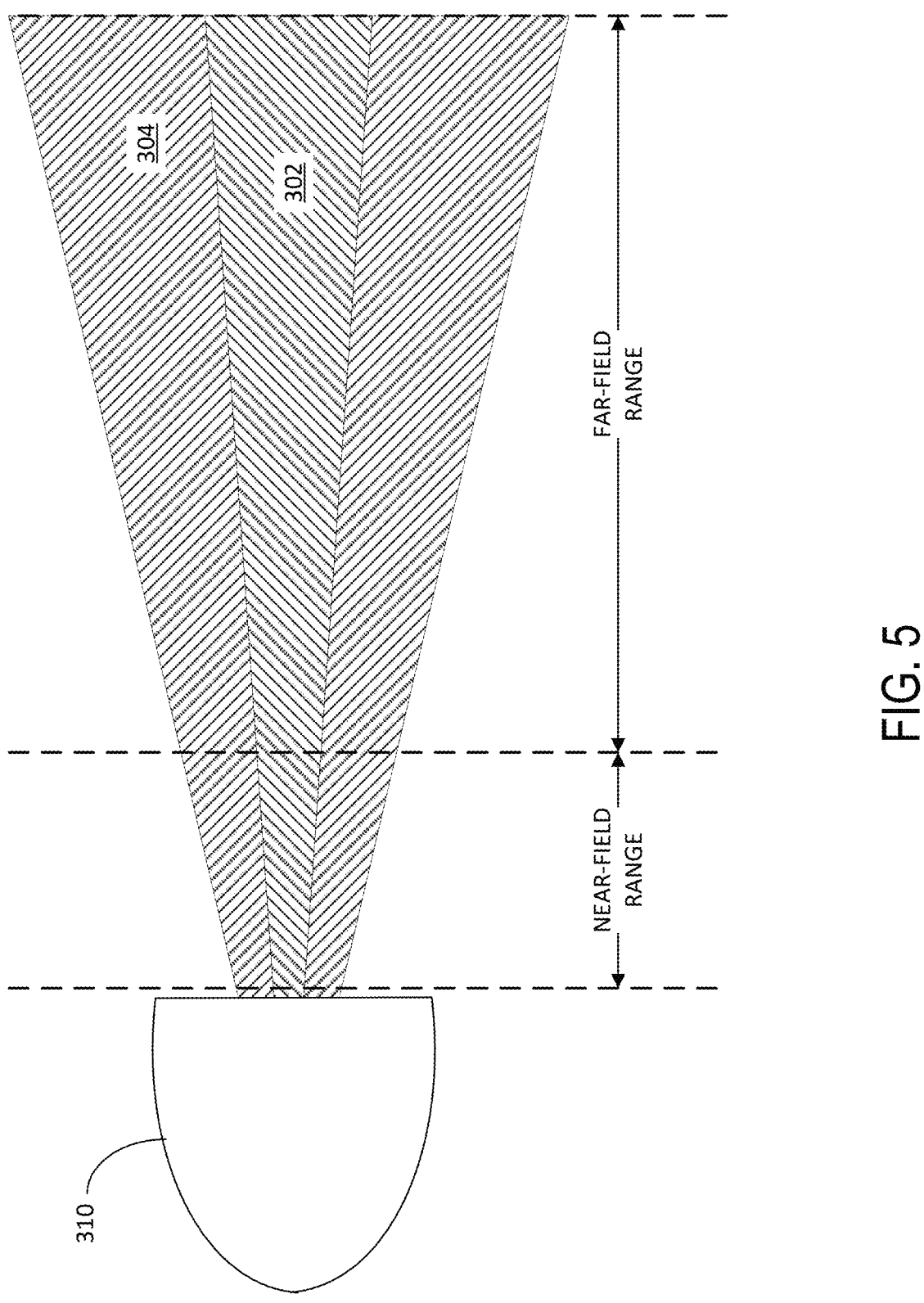
FIG. 5 illustrates a top view of the indicia data capturing device of FIG. 3, according to aspects of the present disclosure.

FIG. 5 illustrates a top view of the indicia data capturing device 310 of FIG. 3, showing the far field range 302 and the near field range 304.

Figure 4:
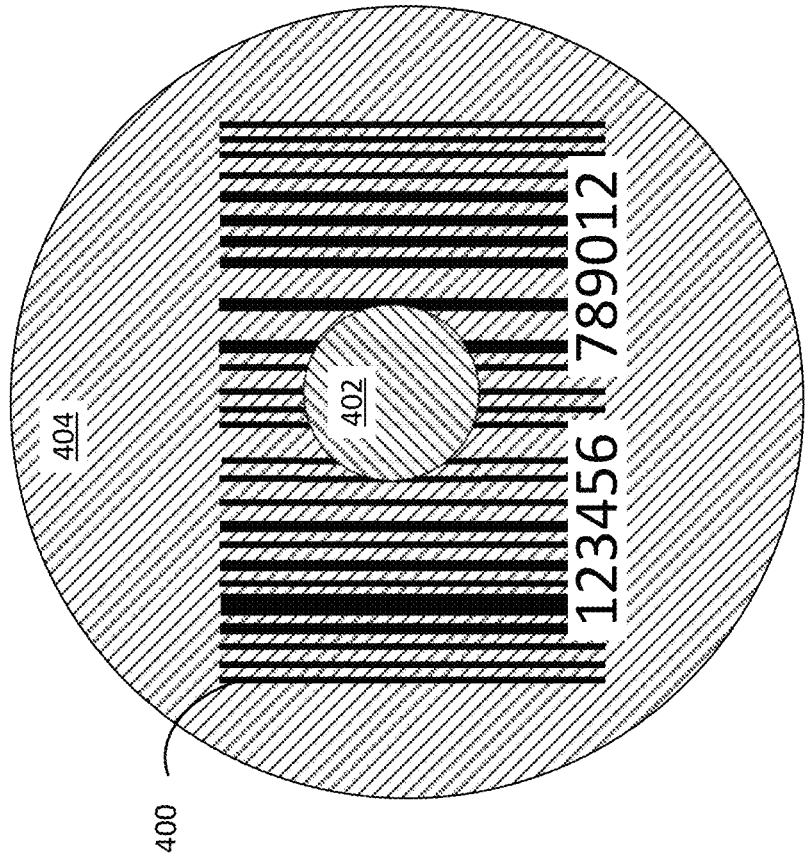
FIG. 4 illustrates illumination patterns when imaging a barcode, according to aspects of the present disclosure.

FIG. 4 illustrates a circular illumination pattern that demonstrates the dual-field illumination characteristics created by the illumination component 124. The illumination pattern is projected onto a barcode 400 to provide illumination coverage that serves both near field and far field imaging operations through a single illumination system. The barcode 400 is positioned within the illumination field to receive light from multiple illumination regions that have different brightness characteristics and field coverage areas. The illumination pattern is configured to concentrate illumination energy in specific regions while distributing additional illumination across peripheral areas to accommodate the operational requirements of both the near field imaging sensor 118a and the far field imaging sensor 118b. The single illumination lens of the illumination component 124 is configured to create this dual-field illumination pattern through optical design characteristics that shape and direct light from the single illumination light source.

As shown in FIG. 4, a far field illumination region 402 is positioned in the center of the illumination pattern to provide concentrated illumination for far field imaging operations. The far field illumination region 402 corresponds to a first portion of projected light having a relatively narrow field of illumination and being relatively bright. The near field illumination region 404 is distributed around the periphery of the far field illumination region 402 to provide illumination coverage for near field imaging operations. The near field illumination region 404 may correspond to a second portion of projected light having a relatively wide field of illumination and being relatively less bright. The illumination lens of the illumination component 124 is configured to create a uniform halo around the main concentrated beam represented by the far field illumination region 402, where the uniform halo corresponds to the near field illumination region 404 that provides consistent illumination characteristics for wide field of view imaging operations.

The illumination pattern shown in FIG. 4 enables the barcode 400 to receive appropriate illumination characteristics based on the distance and imaging component being utilized for scanning operations. When the far field imaging sensor 118b is used to capture images of the barcode 400 positioned at greater distances, the concentrated illumination from the far field illumination region 402 provides sufficient light intensity to enable effective image capture despite the increased distance. When the near field imaging sensor 118a is used to capture images of the barcode 400 positioned at closer distances, the distributed illumination from the near field illumination region 404 provides broader coverage that accommodates the wider field of view characteristics of near field imaging operations. The overlapping coverage areas of the far field illumination region 402 and the near field illumination region 404 may create a continuous illumination field that supports seamless operation across varying scanning distances without requiring separate illumination subsystems for each imaging component.

While FIG. 4 illustrates both the far field illumination region 402 and the near field illumination region 404 as circular, the regions may be square, rectangular, elliptical, or have any other suitable shape. While FIG. 4 illustrates flat illumination fields with a sharp boundary between the far field illumination region 402 and the near field illumination region 404, the boundaries of the regions would typically (but not necessarily) have a relatively quick transition from bright to dim across the boundary between the regions but would likely not be a sharp edge nor would the illumination fields be perfectly flat but rather would likely roll off somewhat in intensity moving away from the center.

Brightness variation compensation techniques may address the inherent illumination differences that result from the dual-field illumination pattern created by the single illumination system. The concentrated central illumination region and the distributed peripheral illumination region may create brightness variations across the illuminated field that could affect image quality and decoding performance. Such brightness variations are indicated in FIG. 4, in which part of the barcode 400 is illuminated by the brighter region 402 and part of the barcode 400 is illuminated by the less bright region 404.

Various compensation methods may be employed to normalize brightness levels across captured images and optimize exposure settings for different illumination conditions. These techniques may enable effective utilization of the dual-field illumination system while maintaining consistent image quality across both near field and far field imaging operations.

Relative illumination calibration functions may provide mathematical correction of brightness variations across captured images. For example, processing circuitry may apply a relative illumination calibration function to an image captured by either the first imaging sensor or the second imaging sensor of an object to normalize the brightness across the image. The calibration function may incorporate predetermined brightness correction factors that correspond to known illumination characteristics of the dual-field pattern. In some cases, the calibration function may apply different correction multipliers to different regions of the captured image based on the expected illumination intensity distribution. The central regions of the image that correspond to the concentrated illumination area may receive brightness reduction factors, while peripheral regions that correspond to the distributed illumination area may receive brightness enhancement factors. This mathematical normalization process may create more uniform brightness distribution across the processed image without requiring physical modifications to the illumination system.

Multiple exposure image capture techniques may enable compensation for brightness variations through selective combination of image data captured under different exposure conditions. The first imaging sensor and the second imaging sensor may be configured to capture two or more images of an object at different exposures to accommodate the varying brightness levels across the illuminated field. Processing circuitry may be configured to stitch together one or more different portions of each of the two or more images having different brightnesses to create a combined image having a more uniform level of brightness. The different portions of each image may comprise one or more annular portions that correspond to the concentric illumination regions created by the dual-field illumination pattern. In some cases, the central annular portion may be selected from an image captured with shorter exposure time to prevent saturation from the concentrated illumination, while outer annular portions may be selected from images captured with longer exposure times to enhance visibility in the distributed illumination regions.

Non-linear exposure functions may provide inherent compensation for brightness variations through adaptive sensor response characteristics. The first imaging sensor and the second imaging sensor may have a non-linear exposure function such that, for example, a central portion of the field of view may be exposed less than a peripheral portion of the field of view to provide a more uniform exposure effect across the field of view. This non-linear response may complement the dual-field illumination pattern by naturally balancing the higher central illumination intensity with reduced exposure sensitivity in the corresponding image regions. The non-linear exposure function may be implemented through sensor design characteristics, electronic control circuits, or software-based exposure mapping algorithms. In some cases, high dynamic range sensors may incorporate non-linear exposure capabilities that automatically adjust sensitivity across different regions of the sensor array based on detected light levels.

Dynamic illumination control techniques may provide real-time adjustment of illumination characteristics based on captured image analysis and environmental conditions. The illumination system may be configured to vary an intensity of the projected light and a time of exposure to reduce brightness saturation from the first portion of the projected light. Processing circuitry may analyze brightness levels in captured images to determine optimal illumination intensity settings for subsequent image capture operations. In some cases, the illumination intensity may be dynamically adjusted based on the brightness level of the captured image to optimize illumination conditions for different scanning scenarios. When captured images indicate excessive brightness in the central illumination region, the illumination intensity may be reduced to prevent saturation while maintaining adequate illumination for the peripheral regions. Conversely, when captured images indicate insufficient illumination in the peripheral regions, the illumination intensity may be increased to enhance visibility while managing potential saturation in the central region.

Alternative compensation approaches may involve operational techniques that leverage the spatial characteristics of the dual-field illumination pattern. An operator may position the indicia data capturing device to avoid the bright central illumination spot when scanning near field objects, using the peripheral illumination for uniform lighting. This positioning technique may enable near field imaging operations to utilize the distributed illumination region while avoiding potential brightness saturation effects from the concentrated central illumination. The wide field of view characteristics of near field imaging sensors may accommodate this positioning approach by capturing target objects that are positioned within the peripheral illumination region rather than directly within the central concentrated beam. In some cases, processing circuitry may process individual images to find barcode segments and stitch them together during the decode process rather than creating a composite image. This segmented processing approach may enable successful decoding operations even when brightness variations prevent creation of a single uniform composite image, as individual segments may be processed with appropriate brightness correction factors before combination during the decoding process.

Dual imaging component systems may incorporate sophisticated control mechanisms that enable optimal selection and operation of imaging components based on scanning conditions, target distances, and environmental factors. These control systems may coordinate the operation of multiple imaging components to ensure that the most appropriate imaging component may be activated for specific scanning scenarios while maintaining efficient power consumption and processing resources. The control mechanisms may operate through various detection methods, user-configurable settings, and automated decision algorithms that analyze real-time conditions to determine optimal imaging component selection. These systems may enable seamless transitions between different imaging modes without requiring manual intervention while also providing manual override capabilities for specialized applications or user preferences.

Manual configuration modes may provide users with direct control over imaging component selection based on specific application requirements or operational preferences. The dual imaging system may be manually configured to use only the near field imaging sensor for applications that exclusively involve close-range scanning operations. In some cases, this configuration may be appropriate for warehouse environments where all target objects may be positioned within a limited distance range, eliminating the need for far field imaging capabilities. Alternatively, the system may be manually configured to use only the far field imaging sensor for applications that primarily involve distant target scanning, such as inventory management in high-bay storage facilities where targets may be positioned at extended distances. The manual configuration approach may also include an automatic selection mode that enables the system to dynamically choose between both imaging components based on real-time analysis of scanning conditions and target characteristics.

Automatic distance detection systems may utilize laser-based measurement techniques to determine target distances and select appropriate imaging components for optimal scanning performance. Such distance detection systems may be, for example, based on time-of-flight, triangulation, or any other suitable range measuring method. The system may automatically detect the distance to an object using a laser pointer aimer dot solution to determine which imaging component to use for subsequent image capture operations. This laser-based distance detection approach may project a focused laser beam toward the target object and analyze the reflected light characteristics to calculate the distance between the scanning device and the target. The distance measurement data may be processed by control algorithms that compare the measured distance against predetermined threshold values to determine whether the near field imaging sensor or the far field imaging sensor may provide optimal imaging performance for the detected target distance. In some cases, the laser aimer system may provide continuous distance monitoring that enables real-time adjustment of imaging component selection as the scanning device may be moved relative to target objects.

Alternating focus detection methods may provide automated imaging component selection through comparative analysis of image quality characteristics captured by multiple imaging components. The system may take alternating images with both imaging components to determine which one may be in focus and then use that component for subsequent capture operations. This approach may involve capturing test images with both the near field imaging sensor and the far field imaging sensor, followed by image analysis algorithms that evaluate focus quality, contrast levels, and edge definition characteristics in each captured image. The focus detection algorithms may calculate focus metrics such as gradient magnitude, frequency domain analysis, or contrast measurement to determine which imaging component may provide superior image quality for the current target distance and scanning conditions. Once the optimal imaging component may be identified through this comparative analysis, the system may continue using the selected imaging component for subsequent scanning operations until conditions change or a new target may be encountered.

Ambient light-based illumination control systems may optimize power consumption and image quality by dynamically adjusting illumination characteristics based on environmental lighting conditions. The illumination component may be turned off altogether when there is sufficient ambient light for imaging, eliminating the need for artificial illumination in well-lit conditions. This adaptive illumination approach may involve continuous monitoring of ambient light levels through light sensors or image analysis algorithms that evaluate the brightness characteristics of captured images. When ambient light levels exceeds predetermined threshold values, the control system may disable the illumination component to conserve power and prevent potential overexposure effects that could degrade image quality. In some cases, the system may implement graduated illumination control that progressively reduces illumination intensity as ambient light levels increase, providing smooth transitions between different lighting conditions while maintaining optimal image capture characteristics.

Integrated control coordination may enable these various control methods to work together to optimize scanning performance across different conditions and distances through comprehensive system management. The distance detection, focus analysis, and ambient light monitoring systems may operate concurrently to provide multi-parameter optimization of imaging component selection and illumination control. In some cases, the laser-based distance detection system may provide initial imaging component selection recommendations that may be refined through alternating focus detection analysis to ensure optimal image quality. The ambient light monitoring system may simultaneously adjust illumination characteristics to complement the selected imaging component and target distance, creating coordinated control that addresses multiple performance factors. The integrated control approach may also incorporate user preference settings, application-specific requirements, and historical performance data to further optimize scanning operations across varying environmental conditions and target characteristics.

A number of implementations have been described. Nevertheless, it will be understood that various modifications may be made without departing from the spirit and scope of the disclosure. Accordingly, other implementations are within the scope of the following claims.

Various embodiments of the present disclosure provide a dual imager barcode scan engine with a single illumination system that addresses the complexity and cost challenges of traditional multi-illumination approaches. The optical assembly comprises a first imaging sensor optimized for far-field scanning with a narrow field of view and extended scanning range, and a second imaging sensor configured for near-field operations with a wider field of view and shorter scanning range. A single illumination system that utilizes one illumination light source and one illumination lens is provided to create a dual-field illumination pattern that includes a concentrated central region with high brightness and narrow field of illumination for far-field imaging, surrounded by a distributed peripheral region with lower brightness and wider field of illumination for near-field operations. Various embodiments of the present disclosure incorporate various brightness compensation techniques to address illumination variations across the dual-field pattern. These may include relative illumination calibration functions that mathematically normalize brightness across captured images, multiple exposure capture with selective image stitching, non-linear exposure functions that balance sensor sensitivity across different regions, and dynamic illumination control that adjusts intensity based on real-time image analysis.

Various embodiments of the present disclosure reduce system complexity, component count, manufacturing costs, and power consumption compared to dual-illumination approaches while maintaining effective imaging performance across both near-field and far-field applications. This unified illumination approach enables integration into compact mobile terminals and handheld devices where space and power constraints are particularly important.

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, which are protected thereby. In all instances, the scope of the claims shall be considered on their own merits in light of this disclosure but should not be constrained by the headings set forth herein.

Also, systems, subsystems, apparatuses, techniques, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatuses and systems described herein, various other components may be used in conjunction with the components and structures disclosed herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

The invention claimed is:

1. An optical assembly comprising:

a first imaging sensor having a first field of view (FOV) and a first scanning range;

a second imaging sensor having a second FOV greater than the first FOV and a second scanning range less than the first scanning range; and an illumination system comprising a single illumination light source and a single illumination lens to project light emitted from the illumination light source;

wherein the illumination lens is configured such that (i) the projected light comprises (a) a first portion having a first field of illumination (FOI) and a first brightness and (b) a second portion having a second FOI and a second brightness, (ii) the first FOI is smaller than the second FOI, (iii) the first brightness is greater than the second brightness, (iv) the second portion surrounds the first portion, and (v) the first portion comprises a majority of a power of the projected light; and wherein the optical assembly is configured to, when imaging an object, compensate for a variation of brightness of the light projected onto the object due to the different FOI and/or brightness of the first and second portions of the projected light.

2. The optical assembly of claim 1, further comprising processing circuitry.

3. The optical assembly of claim 2, wherein the processing circuitry is part of the first imaging sensor and/or the second imaging sensor.

4. The optical assembly of claim 2, wherein the processing circuitry is configured to apply a relative illumination calibration function to an image captured by either the first imaging sensor or the second imaging sensor of an object to normalize the brightness across the image.

5. The optical assembly of claim 2, wherein the first imaging sensor and/or the second imaging sensor are configured to capture two or more images of an object at different exposures; and wherein the processing circuitry is configured to stitch together one or more different portions of each of the two or more images having different brightnesses to create a combined image having a more uniform level of brightness.

6. The optical assembly of claim 5, wherein the one or more different portions of each of the two or more images comprise one or more annular portions.

7. The optical assembly of claim 1, wherein the first imaging sensor and/or the second imaging sensor have a non-linear exposure function such that a central portion of its FOV is exposed less than a peripheral portion of its FOV to provide a more uniform exposure effect across its FOV.

8. The optical assembly of claim 1, wherein the illumination system is configured to vary an intensity of the projected light and a time of exposure to reduce brightness saturation in from the first portion of the projected light.

9. The optical assembly of claim 1, wherein the first scanning range of the first imaging sensor is variable.

10. The optical assembly of claim 1, further comprising an aiming system comprising an aiming light source and an aiming lens through which aiming light from the aiming light source is transmitted.

11. An imaging reader for electro-optically reading a symbol by image capture, comprising:

a housing; and an optical assembly mounted in the housing, the optical assembly comprising:

a first imaging sensor having a first field of view (FOV) and a first scanning range;

a second imaging sensor having a second FOV greater than the first FOV and a second scanning range less than the first scanning range; and an illumination system comprising a single illumination light source and a single illumination lens to project light emitted from the illumination light source;

wherein the illumination lens is configured such that (i) the projected light comprises (a) a first portion having a first field of illumination (FOI) and a first brightness and (b) a second portion having a second FOI and a second brightness, (ii) the first FOI is smaller than the second FOI, (iii) the first brightness is greater than the second brightness, (iv) the second portion surrounds the first portion, and (v) the first portion comprises a majority of a power of the projected light; and wherein the optical assembly is configured to, when imaging an object, compensate for a variation of brightness of the light projected onto the object due to the different FOI and/or brightness of the first and second portions of the projected light.

12. The imaging reader of claim 11, wherein the optical assembly further comprises processing circuitry.

13. The imaging reader of claim 12, wherein the processing circuitry is part of the first imaging sensor and/or the second imaging sensor.

14. The imaging reader of claim 12, wherein the processing circuitry is configured to apply a relative illumination calibration function to an image captured by either the first imaging sensor or the second imaging sensor of an object to normalize the brightness across the image.

15. The imaging reader of claim 12, wherein the first imaging sensor and/or the second imaging sensor are configured to capture two or more images of an object at different exposures; and wherein the processing circuitry is configured to stitch together one or more different portions of each of the two or more images having different brightnesses to create a combined image having a more uniform level of brightness.

16. The imaging reader of claim 15, wherein the one or more different portions of each of the two or more images comprise one or more annular portions.

17. The imaging reader of claim 11, wherein the first imaging sensor and/or the second imaging sensor have a non-linear exposure function such that a central portion of its FOV is exposed less than a peripheral portion of its FOV to provide a more uniform exposure effect across its FOV.

18. The imaging reader of claim 11, wherein the illumination system is configured to vary an intensity of the projected light and a time of exposure to reduce brightness saturation in from the first portion of the projected light.

19. The imaging reader of claim 11, wherein the first scanning range of the first imaging sensor is variable.

20. The imaging reader of claim 11, wherein the optical assembly further comprises an aiming system comprising an aiming light source and an aiming lens through which aiming light from the aiming light source is transmitted.

* * * * *